United States Patent
Lagerqvist et al.

(10) Patent No.: US 10,764,839 B2
(45) Date of Patent: Sep. 1, 2020

(54) NETWORK NODE AND METHOD FOR MANAGING POWER OF CELL REFERENCE SYMBOLS

(71) Applicant: TELEFONAKTIEBOLAGET LM ERICSSON (PUBL), Stockholm (SE)

(72) Inventors: Tomas Lagerqvist, Stockholm (SE); Christian Skärby, Stockholm (SE); Walter Müller, Upplands Väsby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 49 days.

(21) Appl. No.: 15/507,528

(22) PCT Filed: Aug. 28, 2014

(86) PCT No.: PCT/SE2014/050993
§ 371 (c)(1),
(2) Date: Feb. 28, 2017

(87) PCT Pub. No.: WO2016/032380
PCT Pub. Date: Mar. 3, 2016

(65) Prior Publication Data
US 2017/0289925 A1    Oct. 5, 2017

(51) Int. Cl.
*H04W 52/32* (2009.01)
*H04W 52/14* (2009.01)
(Continued)

(52) U.S. Cl.
CPC .......... *H04W 52/325* (2013.01); *H04L 5/001* (2013.01); *H04W 52/143* (2013.01);
(Continued)

(58) Field of Classification Search
CPC . H04W 48/12; H04W 52/143; H04W 52/287; H04W 52/325; H04W 52/343;
(Continued)

(56) References Cited

U.S. PATENT DOCUMENTS

| 5,898,682 | A | 4/1999 | Kanai |
| 8,694,042 | B2 * | 4/2014 | Li .................. H04W 16/06 |
| | | | 455/522 |

(Continued)

FOREIGN PATENT DOCUMENTS

| CN | 1836386 A | 9/2006 |
| CN | 1902860 A | 1/2007 |

(Continued)

*Primary Examiner* — Michael Thier
*Assistant Examiner* — Nevena Zecevic Sandhu
(74) *Attorney, Agent, or Firm* — Sage Patent Group

(57) ABSTRACT

A method performed by a network node for managing power of Cell Reference Symbols, CRS, wherein the network node operates one or more cells and the network node is configured to transmit the CRS in a first power mode. When the network node identifies a first cell which is not actively serving any UEs, which cell is also referred to as an empty cell, the network node reduces the power of the CRS in the first cell in relation to the first power mode. By reducing the power of the CRS, the overall interference of the CRS from the empty cell is reduced, thereby enhancing the performance in cells actively serving UEs.

18 Claims, 4 Drawing Sheets

(51) Int. Cl.
  *H04W 52/28* (2009.01)
  *H04W 52/34* (2009.01)
  *H04W 76/27* (2018.01)
  *H04L 5/00* (2006.01)
  *H04W 88/02* (2009.01)
  *H04W 92/20* (2009.01)

(52) U.S. Cl.
  CPC ....... *H04W 52/287* (2013.01); *H04W 52/343* (2013.01); *H04W 76/27* (2018.02); *H04W 88/02* (2013.01); *H04W 92/20* (2013.01); *Y02D 70/00* (2018.01)

(58) Field of Classification Search
  CPC ... H04W 76/27; H04W 72/005; H04W 48/14; H04W 52/0206; H04W 76/046; H04W 28/16; H04W 72/0413; H04W 24/10; H04W 52/242; H04L 5/001; H04L 5/0073; H04L 5/0053
  See application file for complete search history.

(56) References Cited

U.S. PATENT DOCUMENTS

| | | | | |
|---|---|---|---|---|
| 2006/0252437 | A1* | 11/2006 | Konegger | H04B 7/2687 455/502 |
| 2009/0082026 | A1* | 3/2009 | Yavuz | H04W 52/243 455/446 |
| 2009/0111499 | A1 | 4/2009 | Bosch et al. | |
| 2009/0280819 | A1 | 11/2009 | Brisebois et al. | |
| 2010/0330981 | A1* | 12/2010 | Kazmi | H04W 36/0088 455/422.1 |
| 2011/0170496 | A1* | 7/2011 | Fong | H04L 5/0053 370/329 |
| 2011/0201376 | A1* | 8/2011 | Hu | H04W 52/42 455/522 |
| 2016/0174166 | A1* | 6/2016 | Someya | H04J 11/00 455/522 |
| 2016/0255580 | A1* | 9/2016 | Onaka | H04W 48/00 370/311 |
| 2018/0098306 | A1* | 4/2018 | Xu | H04W 72/005 |

FOREIGN PATENT DOCUMENTS

| | | |
|---|---|---|
| CN | 101860867 A | 10/2010 |
| CN | 102792616 A | 11/2012 |
| CN | 102907148 A | 1/2013 |

* cited by examiner

NETWORK NODE AND METHOD FOR MANAGING POWER OF CELL REFERENCE SYMBOLS

This application is a 371 of International Application No. PCT/SE2014/050993, filed Aug. 28, 2014, the disclosure of which is fully incorporated herein by reference.

TECHNICAL FIELD

Embodiments herein relate to a network node and a method therein. In particular, it relates to a method for managing power of Cell Reference Symbols.

BACKGROUND

Communication devices such as User Equipments (UEs) are enabled to communicate wirelessly in a cellular communications network or wireless communication system, sometimes also referred to as a cellular radio system or cellular networks. The communication may be performed e.g. between two UEs, between a UE and a regular telephone and/or between a UE and a server via a Radio Access Network (RAN) and possibly one or more core networks, comprised within the cellular communications network.

UEs may further be referred to as wireless terminals, mobile terminals and/or mobile stations, mobile telephones, cellular telephones, laptops, tablet computers or surf plates with wireless capability, just to mention some further examples. The UEs in the present context may be, for example, portable, pocket-storable, hand-held, computer-comprised, or vehicle-mounted mobile devices, enabled to communicate voice and/or data, via the RAN, with another entity, such as another wireless terminal or a server.

The cellular communications network covers a geographical area which is divided into cell areas, wherein each cell area being served by a network node. A cell is the geographical area where radio coverage is provided by the network node.

The network node may further control several transmission points, e.g. having Radio Units (RRUs). A cell can thus comprise one or more network nodes each controlling one or more transmission/reception points. A transmission point, also referred to as a transmission/reception point, is an entity that transmits and/or receives radio signals. The entity has a position in space, e.g. an antenna. A network node is an entity that controls one or more transmission points. The network node may e.g. be a base station such as a Radio Base Station (RBS), eNB, eNodeB, NodeB, B node, or BTS (Base Transceiver Station), depending on the technology and terminology used. The base stations may be of different classes such as e.g. macro eNodeB, home eNodeB or pico base station, based on transmission power and thereby also cell size.

Further, each network node may support one or several communication technologies. The network nodes communicate over the air interface operating on radio frequencies with the UEs within range of the network node. In the context of this disclosure, the expression Downlink (DL) is used for the transmission path from the base station to the mobile station. The expression Uplink (UL) is used for the transmission path in the opposite direction i.e. from the UE to the base station.

In 3rd Generation Partnership Project (3GPP) Long Term Evolution (LTE), base stations, which may be referred to as eNodeBs or even eNBs, may be directly connected to one or more core networks. In LTE the cellular communication network is also referred to as E-UTRAN.

An E-UTRAN cell is defined by certain signals which are broadcasted from the eNB. These signals contain information about the cell which can be used by UEs in order to connect to the network through the cell. The signals comprise reference and synchronization signals which the UE uses to find frame timing and physical cell identification as well as system information which comprises parameters relevant for the whole cell.

A UE needing to connect to the network must thus first detect for a suitable cell, as defined in 3GPP TS 36.304 v11.5.0. This is performed by measuring on received reference signals sent by neighboring cells, also referred to as "listening" for a suitable cell. The suitable cell is commonly the cell with best quality of signal. Listening for a suitable cell may comprise searching for synchronization signals transmitted from the network node in an OFDM subframe. When a suitable cell is found the UE performs random access, according to a system information for the cell. This is done in order to transmit a Radio Resource Control (RRC) connection setup request to the network node. Assuming the random access procedure succeeds and the network node receives the request, the network node will either answer with an RRC connection setup message, which acknowledges the UEs request and tells it to move into RRC connected state, or an RRC connection reject, which tells the UE that it may not connect to the cell. In RRC connected state the parameters necessary for communication between the network node and the UE are known to both entities and a data transfer between the two entities is enabled.

To facilitate handover to other cells, each network node may store cell identities that are supported by the other network nodes in an address database, in order to know how to contact the network node of potential target cells for handover. Each network node serving a cell typically stores in the data base which cells it has neighbor relations to, i.e. which of the cells in the area UEs often perform handover to. The cell's neighbor relations will hereafter be referred to as the cell's "neighbor relation list".

Cell specific Reference Signals (CRS) are UE known symbols that are inserted in a Resource Element (RE) of a subframe of an Orthogonal Frequency-Division Multiplexing (OFDM) time and frequency grid and broadcasted by the network node. Each RE has an extension in the frequency domain corresponding to an OFDM sub carrier and an extension in the time-domain corresponding to an OFDM symbol interval.

The CRS are used by the UE for downlink channel estimation. Channel estimation is used for demodulation of downlink data both when the UE is in RRC connected state and is receiving user data and when the UE is in RRC idle state and is reading system information. Due to the latter use case, the CRSs must be transmitted even from cells which do not have any UEs in RRC connected state since the eNB cannot know whether a UE wants to access the network until it performs random access. Downlink cell specific reference signals are inserted within the first and third last OFDM symbol of each slot with a frequency domain spacing of six sub-carriers. A slot is a time period of the OFDM time and frequency grid, which is usually 0.5 msec long. A problem with the known technology is therefore that cells without any UEs in RRC connected state still consume power due to CRS broadcasting.

In case several antennas are used by the network node for transmitting and each antenna is representing a cell, each antenna has to transmit a unique reference signal in order for the UE to connect to that specific cell. When one antenna transmits, the other antennas have to be silent in order not to interfere with the first antennas reference signal. To reduce the interference of reference signals between the cells, the position of the CRS is usually shifted in frequency between the cells. The CRS can be shifted between 0-5 sub carriers, each sub carrier corresponding to a frequency shift of 15 kHz for LTE. The cell specific frequency shift can be derived from the physical Cell Identity (Cell ID) which is signaled to the UE by selection of appropriate Primary Synchronization Channel (PSCH) and Secondary Synchronization Channel (SSCH Although this solution reduces the interference of reference symbols between cells, it has the problem that the reference symbols of one cell will disturb Physical Downlink Shared Channel (PDSCH) and Physical Downlink Control Channel (PDCCH) symbols of neighboring cells.

Hence, even though cells do not have any UEs in RRC connected state, disturbance may impact UE DL throughput in neighboring cells. This will especially be the case when the UE is in and/or close to borders between cells.

Reducing the power of the CRS may mitigate this problem. However, in order to access a cell the UE must be able to hear the CRS of the cell, i.e. the UE must be able to recognize and receive the CRS transmitted from the cell. Therefore reducing the power of the CRS also shrinks the size of the cell, since more distant UEs no longer will hear the CRS. Furthermore, the quality of the channel estimates used for demodulation decreases when the Signal to Interference Ratio (SINR) on the CRS decreases. Reducing the power of the CRS therefore causes degradation of cell edge performance. This degradation is further aggravated when the load in the network increases, especially if the data is transmitted with higher power than the CRS, which is usually the case when the effect of CRS interference is to be reduced.

SUMMARY

It is therefore an object of embodiments herein to enhance the performance in a wireless communications network.

According to a first aspect of embodiments herein, the object is achieved by a method performed by a network node for managing power of Cell Reference Symbols, CRS. The network node operates one or more cells and is configured to transmit the CRS in a first power mode. When a first cell is identified, which first cell is not actively serving any UEs, the network node reduces power of the CRS in the first cell in relation to the first power mode.

According to a second aspect of embodiments herein, the object is achieved by a network node for performing the method for managing power of Cell Reference Symbols, CRS. The network node operates one or more cells and is configured to transmit the CRS in a first power mode. The network node is configured to identify a first cell that is not actively serving any UEs in RRC connected mode. The network node further is configured to reduce power of the CRS in the first cell in relation to the first power mode.

By reducing the power of the CRS in cells that do not serve any UEs in RRC connected mode, the power consumption and the interference from empty cells can be reduced, thereby enhancing the performance of cells that have UEs in RRC connected mode. In a non-loaded system, reducing the power of the reference symbols will reduce interference and increase single UE throughput when CRSs are shifted in the frequency domain.

BRIEF DESCRIPTION OF THE DRAWINGS

Examples of embodiments herein are described in more detail with reference to attached drawings in which.

DETAILED DESCRIPTION

Figure 1:
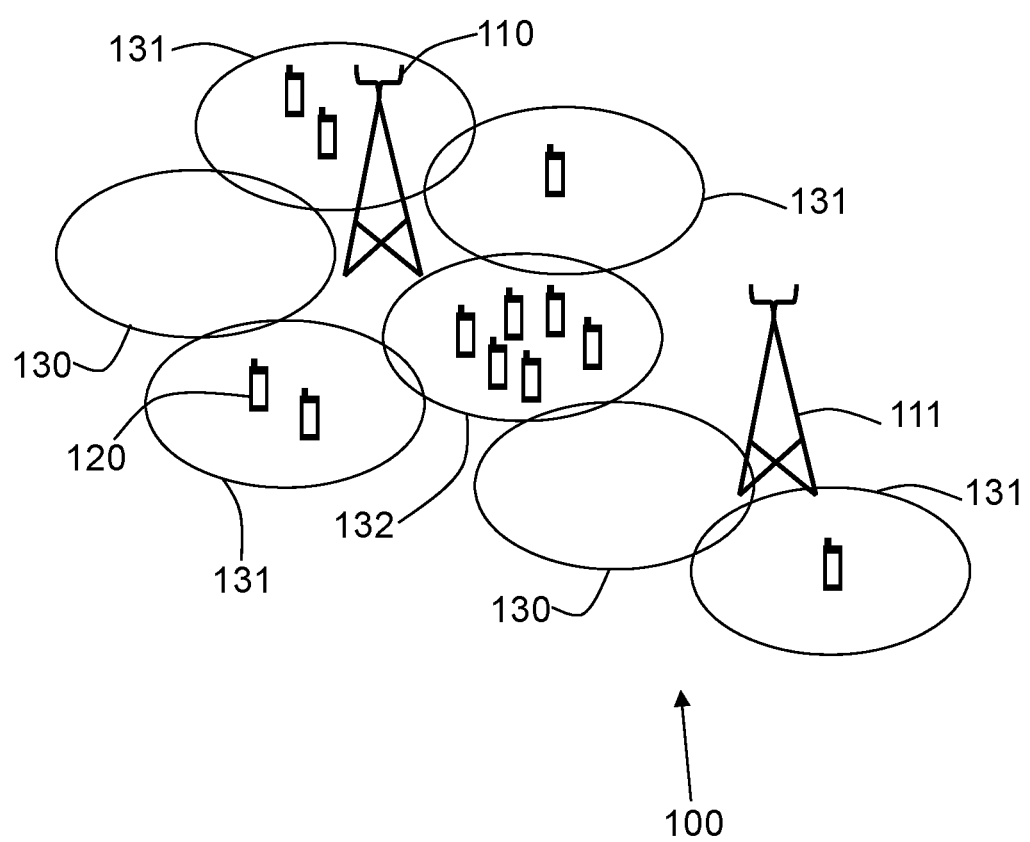
FIG. 1 is a schematic block diagram illustrating embodiments of a wireless communications network.

FIG. 1 depicts an example of a wireless communications network 100 according to a first scenario in which embodiments herein may be implemented. The wireless communications network 100 is a wireless communication network such as an LTE, E-Utran, WCDMA, GSM network, any 3GPP cellular network, Wmax, or any cellular network or system.

The wireless communications network 100 comprises a plurality of network nodes whereof two, a first network node 110 and a second network node 111 are depicted in FIG. 1. The first network node 110 and the second network node 111 are network nodes which each may be a transmission point such as a radio base station, for example an eNB, an eNodeB, or an Home Node B, an Home eNode B or any other network node capable to serve a wireless terminal such as UE or a machine type communication device in a wireless communications network. The first network node 110 and the second network node 111 each serves a plurality of cells 130, 131, 132.

The wireless communications network 100 comprises a UE 120. The first network node 110 and the second network node 111 may each be a transmission point for the wireless terminal 120. The UE 120 is within radio range of the first network node 110 and the second network node 111, this means that it can hear signals from the first network node 110 and the second network node 111.

The UE 120 may e.g. be a wireless terminal, a wireless device, a mobile wireless terminal or a wireless terminal, a mobile phone, a computer such as e.g. a laptop, a Personal Digital Assistant (PDA) or a tablet computer, sometimes referred to as a surf plate, with wireless capability, or any other radio network units capable to communicate over a radio link in a wireless communications network. Please note the term wireless terminal used in this document also covers other wireless devices such as Machine to machine (M2M) devices.

Figure 2:
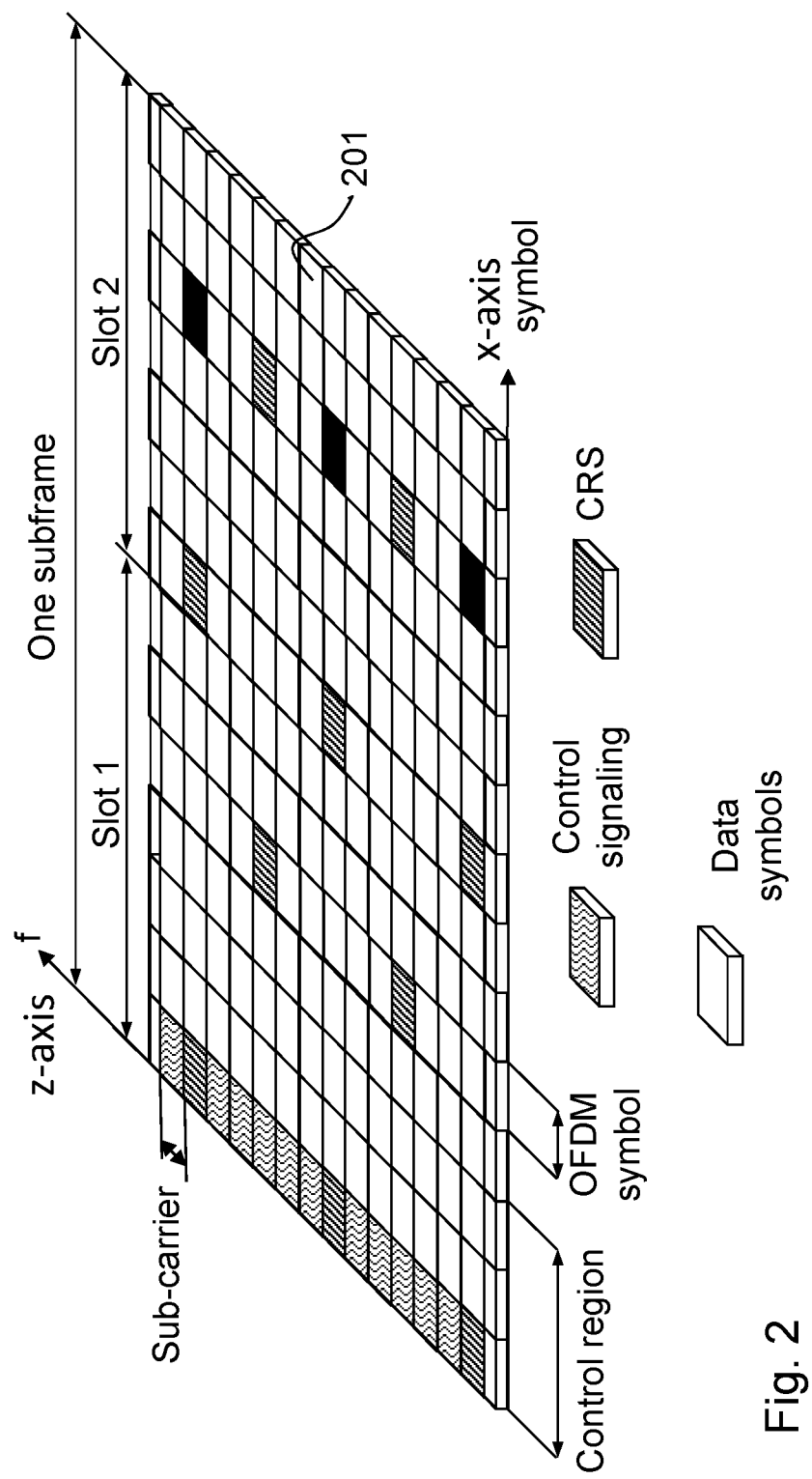
FIG. 2 is a schematic block diagram illustrating embodiments of an OFDM subframe.

FIG. 2 shows an exemplary downlink OFDM time and frequency grid, which is also referred to as an OFDM subframe. Each subframe comprises two slots. Each slot comprising a number of resource elements (RE) 201 extending both in the time domain (x-axis) and in the frequency domain (z-axis). Each RE's 201 extension in the frequency domain is referred to as a sub-carrier whereas the extension in the time domain is referred to as an OFDM symbol. As can be seen in FIG. 2, the first OFDM symbol comprises control signaling and CRS which carries the necessary information about the network node 110 to allow the UE 120 to connect to it. The control signaling is located in the beginning of each subframe, also known as the control region of the subframe, and spans the full bandwidth of the subframe. FIG. 2 shows an exemplary size of a normal control region of three OFDM symbols, the size of the control region may however be dynamically adjusted according to the current traffic situation.

The CRS are used by the UE 120 for downlink channel estimation. Channel estimation is used for determining the demodulation of downlink data both when the UE 120 is in RRC connected state and is receiving user data and when the UE 120 is in RRC idle state and is reading system information. Downlink CRS are inserted within the first and third last OFDM symbol of each slot with a frequency domain spacing of six sub-carriers.

The subframe also comprises data symbols used for transmitting user data between the network node 110 and the UE 120. The data symbols are situated in the region following the control region, which is also referred to as the data region.

Example of embodiments of a method in the network node 110 for managing power of CRS, will now be described with reference to a flowchart depicted in FIG. 3. The network node 110 operates one or more cells and is configured to transmit the CRS in a first power mode during operation. This relates to normal operation. The first power mode may also be referred to as the normal power mode which is used when the at least one cell of the network node 110 is serving at least one UE 120 in RRC connected mode. In this power mode CRS and data symbols are transmitted with the same power, i.e. the power difference between the CRS and the data symbols is zero or almost zero.

The method comprises the following actions, which actions may be taken in any suitable order. Dashed lines of a box in FIG. 3 indicate that this action is not mandatory.

Action 301

The network node 110 identifies a first cell 130 which is not actively serving any UEs 120 in RRC connected mode. When the cell is not actively serving any UEs 120, the cell is referred to as an empty cell.

The cell is not actively serving any UEs 120 when the network node 110 has not sent or received any messages to/from any UEs 120 in the cell within a predetermined time, and/or when the cell does not have any UEs 120 in RRC connected mode.

The cell may switch from not actively serving any UEs 120 to actively serving UEs in case of certain events. Events that trigger a switch may e.g. be that the network node 110 sends a page message in the cell 130, receives a random access preamble in the cell 130 or sends a random access response in the cell 130. It may further be triggered when the network node sends/receives Common Control Channel messages, Dedicated Control Channel messages and/or Dedicated Traffic Channel messages in the cell 130.

Action 302

When the network node 110 has identified a first cell 130 which is not actively serving any UEs 120, i.e. an empty cell 130, the network node 110 reduces the power of the CRS in the first cell 130 in relation to the first power mode. This reduced power mode may also be referred to as low power mode. By reducing the power of the CRS to a power level lower than the power level of the data symbols, the overall interference of the CRS from the empty cell 130 is reduced.

In some embodiments the reduced CRS power is applied on CRS which are sent on any Orthogonal Frequency-Division Multiplexing (OFDM) symbol of a subframe, except the first OFDM symbol of the subframe. By applying the reduced CRS power on all the OFDM symbols except the first OFDM symbol, the interference by the CRS is reduced while at the same time allowing UEs 120 to hear the CRS from the empty cell 130.

The network node 110 holds the reduced CRS power as long as the cell 130 is determined not to actively serve any UEs 120.

The CRS power may further be adapted in several levels. Possible values for the reduced power levels may be e.g. −3, −2, −1 dB compared to the other symbols, thereby allowing a reduction of power in three steps. However, other and/or further power levels may also be used.

The power difference may be signaled to the UE 120 in the system information where it may be used to improve the demodulation performance for modulation types which carry information in the amplitude domain. The modulation scheme used may be e.g. be 16 QAM, 64 QAM and/or any other modulation schemes which carries information in the amplitude domain.

In a further embodiment a hysteresis function may be applied when changing CRS power level, thereby avoiding unnecessary switching between the power modes when the cell 130 is switching from not actively serving any UEs 120 to actively serving UEs very quickly.

Action 303

The network node 110 may further send information about CRS power and the number of RRC connected UEs 120 of each cell, to neighboring cells listed in a neighbor relation list. The neighboring cells may be connected to the same or to different network nodes 111. The information may be sent via an X2 interface when a neighboring cell is served by an other network node 111. In a further embodiment the information may be sent over a S1 interface via a Mobility Management Entity (MME).

When the UE 120 wants to connect to a network node 110, it measures the average Received CRS Power (RSRP) from each cell it can hear, and uses that information to decide which of the cells is suitable to connect to. The RSRP may also be used for connected state mobility, where the network node 110 uses layer 3 measurement reports from the UE 120 sent on the uplink shared channel to support handover decisions. Such a report may for example state that the UE 120 is about to move out of coverage of its current serving cell. However, 3GPP offers a set of tools and mechanisms which the network node 110 can configure in the UE 120 in order to get other reports which are relevant and needed. One example is the A3 event in which the network node 110 configures the UE 120 to send the RSRP of both the serving cell and neighbor cells should the neighbor RSRP become sufficiently strong compared to the serving cell. This information may then be forwarded to the neighboring cells by the network node 110.

Action 304

In some embodiments the network node 110 also receives information about the CRS power mode and number of actively served UEs 120 in neighboring cells. The information may be received from neighboring network nodes 111. When the information is received from a neighboring network node 111 it may be received via the X2 interface.

In a further embodiment the information may also be received over the S1 interface via the MME.

The information may be used to allow the network node 110 to configure Cell Individual Offsets (CIO) with both positive and negative values. The UE 120 may add the CIO for a given cell to the measured RSRP of that cell, in order to compensate for the low CRS power level of that cell. By doing so the UE 120 may connect to another cell, e.g. the empty cell 130, even though the RSRP is lower for the empty cell 130 than for another cell 131, 132 with actively served UEs 120. CIO can be configured both in IDLE mode, where it is broadcasted in System Information Blocks (SIB), and in connected mode, where it is sent in a dedicated RRC configuration to each UE 120.

Action 305

When the network node has received the information about neighboring cells it may use this information to identify a second cell 131, which cell 131 is actively serving at least one UE 120 and is neighbouring a cell 132 where the number of actively served UEs 120 exceeds a first threshold, based on the information received in action 304.

Action 306

When the network node has identified a second cell 131 according to action 305, it may increase the power of the CRS in the second cell 131 in relation to the first power mode. By increasing the power of the CRS in the second cell 131, UEs located in the surrounding cells are able to more easily detect the second cell in order to connect to it.

The CRS power may also be increased in several levels. Possible values for the increased power levels may be e.g. 1.77 and 3 dB compared to the other symbols, thereby allowing an increase of power in two steps. However, other and/or further power levels may also be used.

By increasing the power of the CRS in the second cell 131, UEs located in the surrounding cells are able to more easily detect the second cell in order to connect to it.

Figure 4:
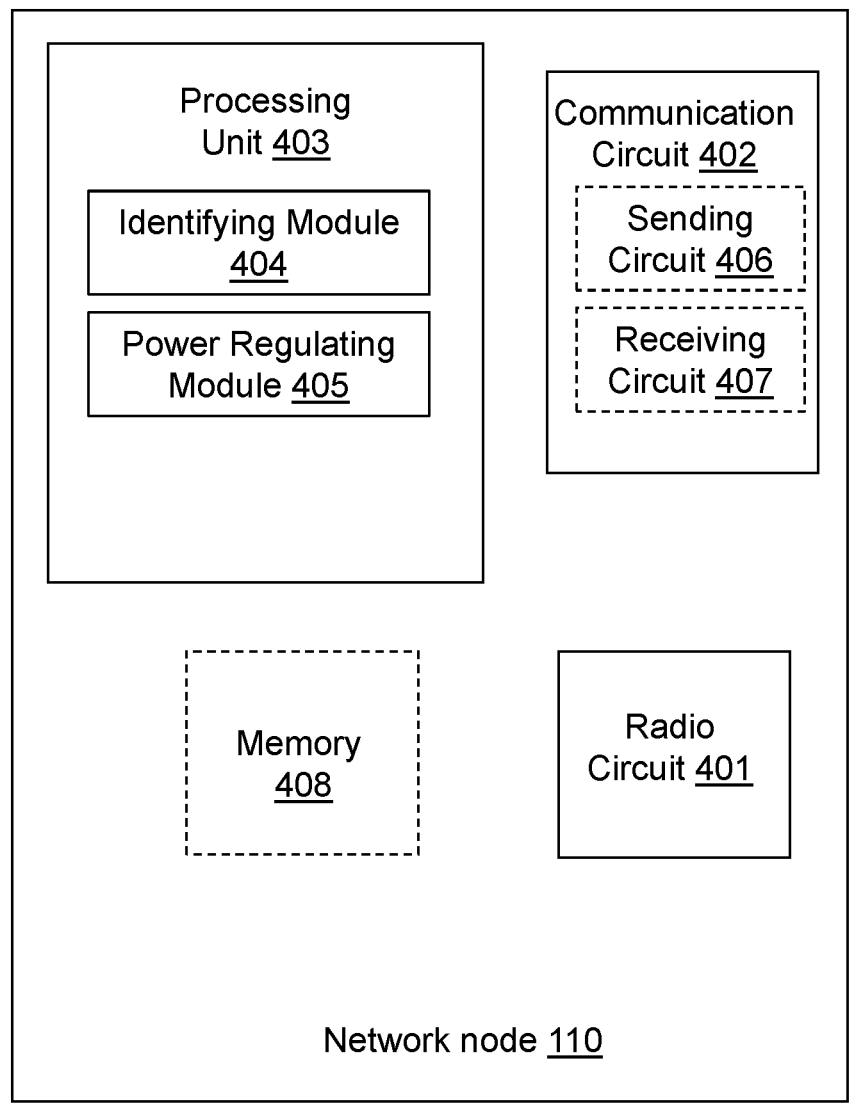
FIG. 4 is a schematic block diagram illustrating embodiments of a network node.

To perform the method actions for managing power of Cell Reference Symbols, (CRS) described above in relation to FIG. 2, the network node 110 comprises the following arrangement depicted in FIG. 4. As mentioned above the network node 110 operates one or more cells and is normally configured to transmit the CRS in a first power mode.

The network node 110 comprises a radio circuitry 401 to communicate with UEs 120, a communication circuitry 402 to communicate with other network nodes and a processing unit 403.

The network node 110 is configured to, e.g. by means of an identifying module 404 being configured to, identify a first cell 130 that is not actively serving any UEs 120. The network node 110 is further configured to, or comprises a power regulating module 405 configured to, reduce power of the CRS in the first cell 130 in relation to the first power mode, when a first cell is identified not to actively serve any UEs 120.

In some embodiments herein, the network node 110 may further be configured to, e.g. by means of a sending circuitry 406 being configured to, send information about the CRS power mode and the number of actively served UEs 120 to neighbouring network nodes 111. In one embodiment the means to send information about the CRS power mode and the number of connected UEs 120 to neighbouring network nodes 120 may be an X2 interface. The sending circuit 406 may be comprised in the communication circuitry 402.

In a further embodiment the network node 110 may be configured to, e.g. by means of a receiving circuitry 407 being configured to, receive information about the CRS power mode and number of actively served UEs 120 in neighbouring cells. The information is received from the neighboring network nodes 111. The receiving circuit 407 may be comprised in the communication circuitry 402.

The network node 110 may further be configured to, or may comprise the identifying module 404 further being configured to, identify a second cell 131, which cell 131 is actively serving at least one UE 120 and is neighbouring a cell 132 where the number actively served UEs 120 exceeds a first threshold.

In a further embodiment the network node is configured to, or comprises the power regulating unit 405 further being configured to, increase the CRS power in the second cell 131 in relation to the first power mode when the number of actively served UEs 120 in the neighboring cell 132 exceeds the first threshold.

In order to reduce unnecessary switching between the power modes, the network node 110 may further be configured to, or may comprise the power regulating unit 405 further being configured to reduce and/or increase the CRS power using a hysteresis function. By using a hysteresis function the network node 110 may not switch power mode immediately when the number of actively served UEs 120 changes, but will remain in one power mode for a certain amount of time after the change of actively served UEs 120 has taken place.

Figure 3:
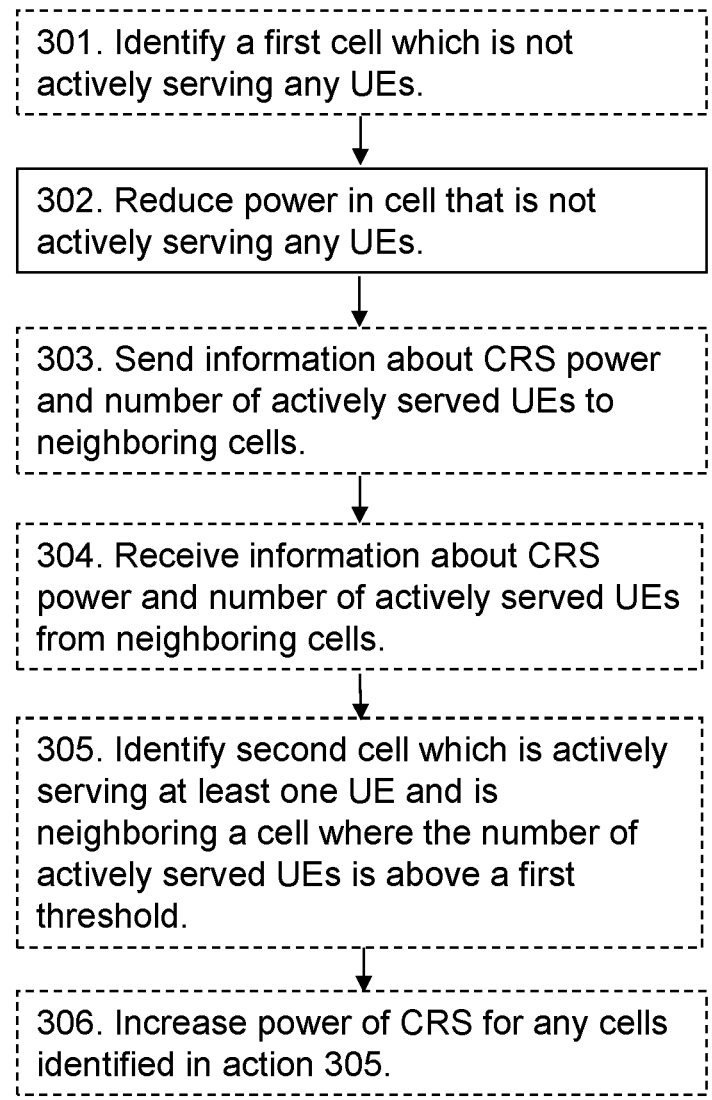
FIG. 3 is a flowchart depicting embodiments of a method in a network node.

The embodiments herein for managing power of Cell Reference Symbols, (CRS) may be implemented through one or more processors, such as the processing unit 403 in the network node 110 depicted in FIG. 3, together with computer program code for performing the functions and actions of the embodiments herein. The program code mentioned above may also be provided as a computer program product, for instance in the form of a data carrier carrying computer program code for performing the embodiments herein when being loaded into the in the network node 110. One such carrier may be in the form of a CD ROM disc. It is however feasible with other data carriers such as a memory stick. The computer program code may furthermore be provided as pure program code on a server and downloaded to the network node 110.

Those skilled in the art will also appreciate that the identifying module 404 and power regulating module 405 described above may refer to a combination of analog and digital circuits, and/or one or more processors configured with software and/or firmware, e.g. stored in the memory 408, that when executed by the one or more processors such as the processing unit 403 as described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

The network node 110 may further comprise a memory 408 comprising one or more memory units. The memory 409 is arranged to be used to store obtained information, measurements, data, configurations, schedulings, and applications to perform the methods herein when being executed in the network node 110.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method performed by a network node for managing power, wherein the network node operates one or more cells, the method comprising:
   transmitting Cell Reference Symbols (CRS) in a first power mode, wherein in the first power mode the CRS and data symbols are transmitted with a same power;

when a first cell is identified that is not actively serving any User Equipments (UEs), reducing power of the CRS in the first cell in relation to the first power mode, wherein the reduced power is applied on the CRS that are sent on all Orthogonal Frequency-Division Multiplexing (OFDM) symbols of a subframe, except a first OFDM symbol of the subframe; and when the first cell is determined to actively serve at least one UE:

receiving, from neighbouring network nodes, information about a CRS power mode and a number of actively served UEs in neighbouring cells;

identifying, based on the received information from the neighbouring network nodes, a second cell that is actively serving at least one UE and is neighbouring a cell where the number of actively served UEs exceeds a threshold; and increasing the CRS power in the second cell in relation to the first power mode.

2. The method according to claim 1, wherein the method further comprises:

sending information about the CRS power and a number of Radio Resource Control (RRC) connected UEs to one or more neighbouring network nodes.

3. The method according to claim 2, wherein the information is sent via an X2 interface.

4. The method according to claim 1, wherein reducing and/or increasing the CRS power is performed using a hysteresis function.

5. The method of claim 1, wherein the identifying the first cell as not actively serving any UEs comprises one or more of:

determining that the first cell has not sent or received any messages to any UEs within a predetermined time; or determining that the first cell is not operating with any UEs in a connected mode.

6. The method of claim 1, wherein the determining when the first cell actively serves at least one UE is based on one or more of the following:

the network node receiving a random access preamble in the first cell or sending a random access response in the first cell; or the network node sending or receiving a page message, a Common Control Channel message, a Dedicated Control Channel message, or a Dedicated Traffic Channel message in the first cell.

7. The method of claim 1, further comprising:

maintaining the reduced power of the CRS in the first cell while the first cell is determined to not actively serve any UEs.

8. The method of claim 1, further comprising:

signaling a power difference to at least one UE, the power difference based on the reduced power of the CRS in the first cell in relation to the first power mode.

9. The method of claim 1, wherein the reducing of the power of the CRS in the first cell further includes the network node configuring Cell Individual Offsets (CIO) for the first cell.

10. A network node for managing power, wherein the network node operates one or more cells, the network node further being configured to:

transmit Cell Reference Symbols (CRS) in a first power mode, wherein in the first power mode the CRS and data symbols are transmitted with a same power;

identify a first cell that is not actively serving any User Equipments (UEs);

reduce power of the CRS in the first cell in relation to the first power mode, wherein the reduced power is applied on the CRS that are sent on all Orthogonal Frequency-Division Multiplexing (OFDM) symbols of a subframe, except a first OFDM symbol of the subframe;

receive, from neighbouring network nodes, information about a CRS power mode and a number of actively served UEs in neighbouring cells;

identify, based on the received information from the neighbouring network nodes, a second cell that is actively serving at least one UE and is neighbouring a cell where the number of actively served UEs exceeds a threshold; and increase the CRS power in the second cell in relation to the first power mode.

11. The network node according to claim 10, wherein the network node further is configured to:

send information about the CRS power mode and the number of actively served UEs to one or more neighbouring network nodes.

12. The network node according to claim 10, wherein sending information about the CRS power mode and the number of actively served UEs to the neighbouring network nodes is performed using an X2 interface.

13. The network node according to claim 10, wherein the network node further is configured to:

reduce and/or increase the CRS power using a hysteresis function.

14. The network node according to claim 10, wherein the identifying the first cell as not actively serving any UEs comprises one or more of:

determining that the first cell has not sent or received any messages to any UEs within a predetermined time; or determining that the first cell is not operating with any UEs in a connected mode.

15. The network node according to claim 10, wherein the determining when the first cell actively serves at least one UE is based on one or more of the following:

the network node receiving a random access preamble in the first cell or sending a random access response in the first cell; or the network node sending or receiving a page message, a Common Control Channel message, a Dedicated Control Channel message, or a Dedicated Traffic Channel message in the first cell.

16. The network node according to claim 10, further comprising:

maintaining the reduced power of the CRS in the first cell while the first cell is determined to not actively serve any UEs.

17. The network node according to claim 10, further comprising:

signaling a power difference to at least one UE, the power difference based on the reduced power of the CRS in the first cell in relation to the first power mode.

18. The network node according to claim 10, wherein the reducing of the power of the CRS in the first cell further includes the network node configuring Cell Individual Offsets (CIO) for the first cell.

* * * * *